INVENTORS.
PHILLIP S. MITTELMAN
RICHARD C. ROSS
BY
ATTORNEYS

INVENTORS.
PHILLIP S. MITTELMAN
RICHARD C. ROSS
BY
ATTORNEYS

United States Patent Office 3,404,274
Patented Oct. 1, 1968

3,404,274
METHOD FOR MEASURING THE SHIELDING EFFECTIVENESS OF A HETEROGENEOUS STRUCTURE FOR SHIELDING AGAINST FUNDAMENTAL CHARGED PARTICLES
Phillip Sidney Mittelman and Richard C. Ross, Armonk, N.Y., assignors to United Nuclear Corporation, White Plains, N.Y., a corporation of New York
Filed Sept. 12, 1963, Ser. No. 308,593
2 Claims. (Cl. 250—83.3)

This invention relates to a method for measuring the shielding effectiveness of a heterogeneous structure for shielding against fundamental charged particles. More particularly, it relates to a method utilizing gamma rays to determine the effectiveness of a heterogeneous structure such as a space vehicle, having non-uniform mass distribution for shielding against fundamental charged particles, especially proton radiation.

Fundamental charges particles, protons, alpha particles and their near relatives $H^2$, $H^3$, and $He^3$ passing through matter lose most of their energy through ionization and excitation of atoms in an absorber. In principle, it is possible to calculate the shielding effectiveness of a homogeneous structure that has simple geometry for shielding against an incident charged particle. For heterogeneous structures of irregular shapes a high energy particle accelerator which is capable of producing well collimated and nearly monoenergetic beams of charged particles can be used. The high cost of such an apparatus and its relative immobility due to its bulkiness, however, limit its versatility and commercial value.

The present invention provides a simple and an effective method to determine the shielding effectiveness of a complicated heterogeneous structure against fundamental charged particles. In accordance with the invention, a beam of gamma radiation of a predetermined initial intensity is directed to the structure. Only the substantially unscattered gamma radiation that attenuates through the structure is detected. The initial intensity of the gamma radiation then is compared with the attenuated and substantially unscattered gamma radiation to determine the integral electron density of the path of the beam of the gamma radiation. This integral electron density is related as noted below to the energy attenuation of the charged particles, therefore a measurement of the shield effectiveness of a heterogeneous structure against fundamental charged particles can be obtained.

To facilitate a better understanding of this invention it is described in detail with reference to the accompanying drawings wherein.

Figure 1:
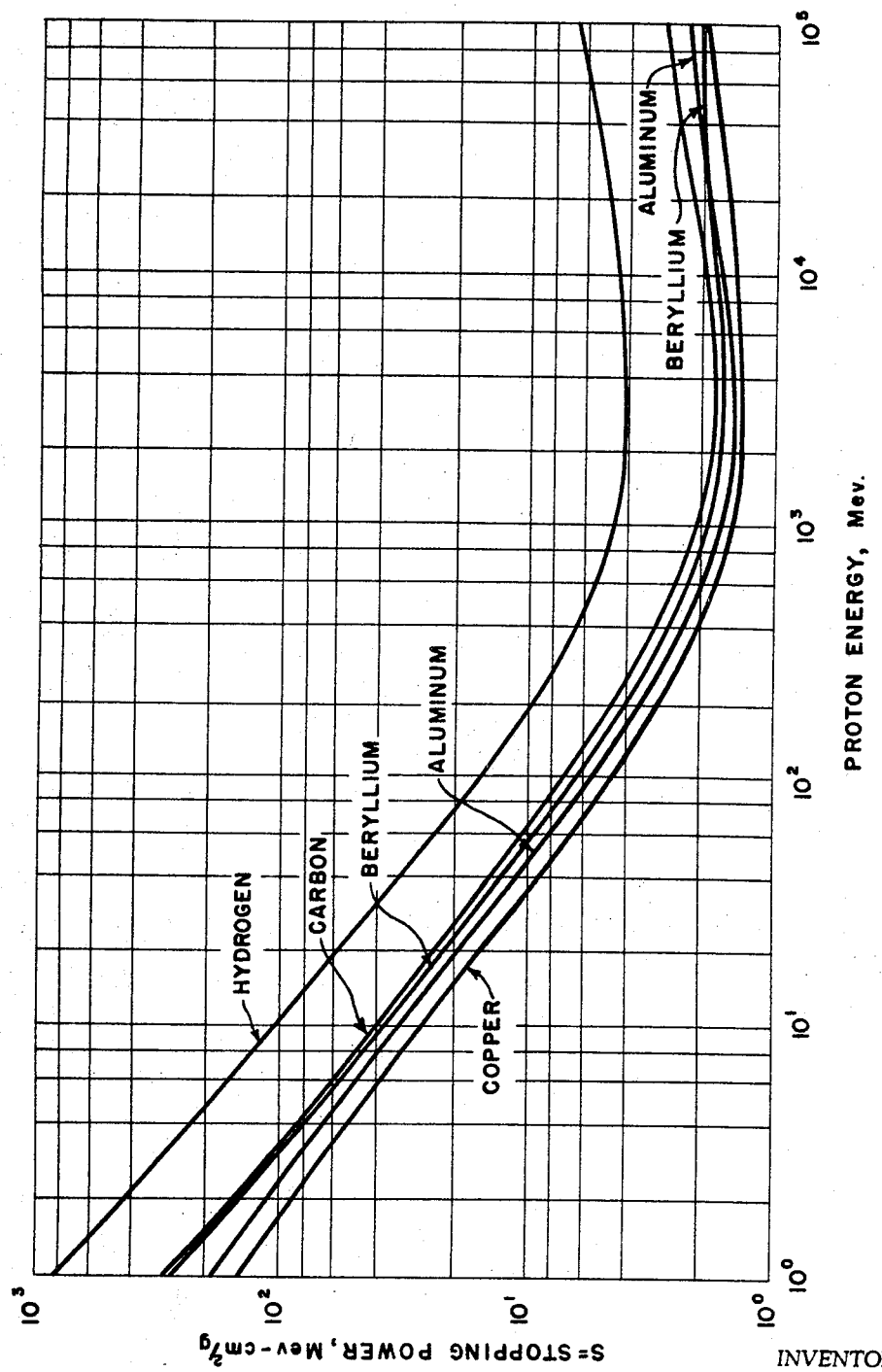
FIGURE 1 is a graph showing the stopping powers in terms of mev.-cm$^2$/gm. of different elements against proton of various energy.
Figure 2:
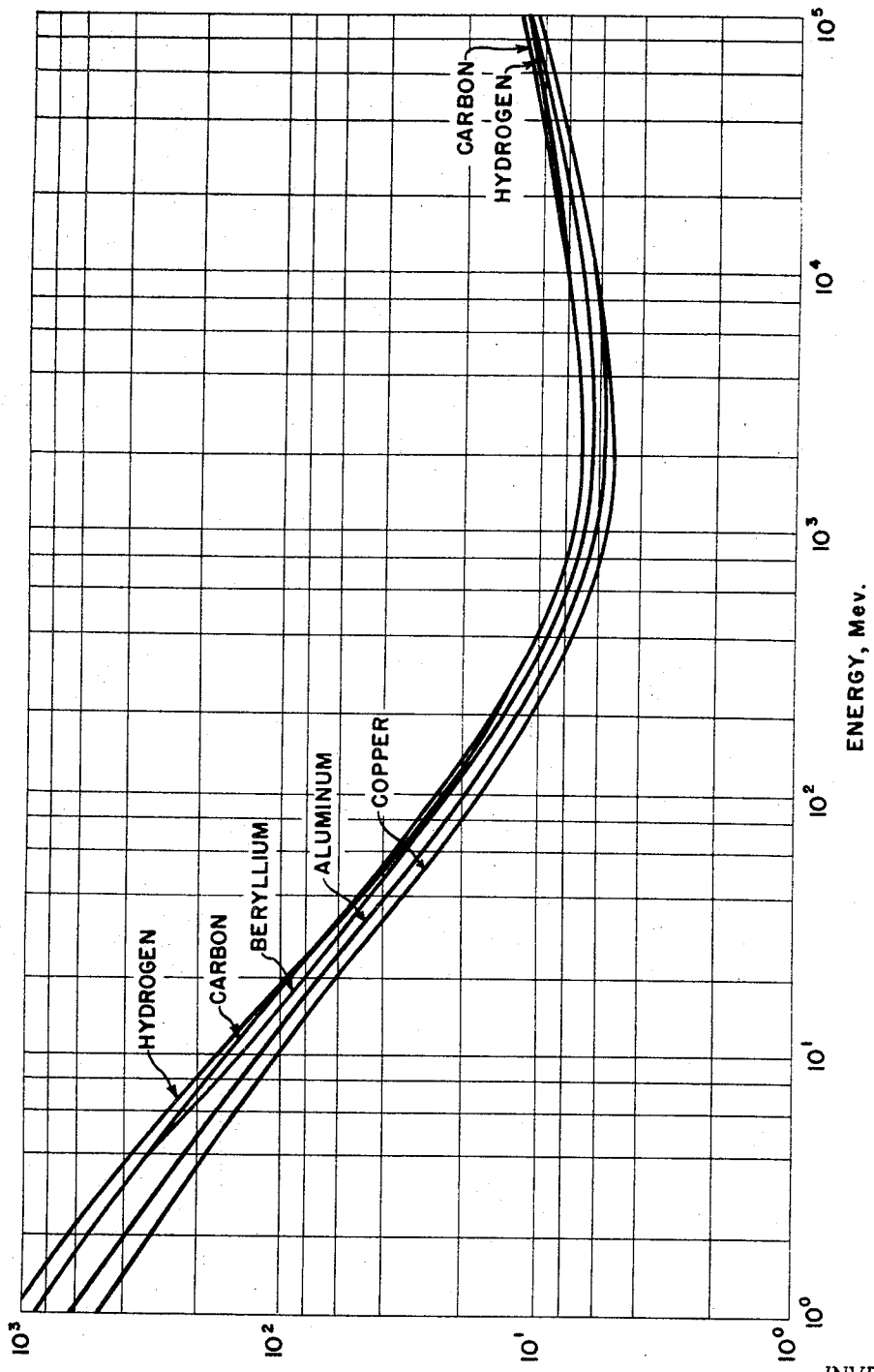
FIGURE 2 is a graph showing the stopping power of the same elements with the stopping powers put in terms of mev./$10^{24}$ electrons/cm.$^2$.

The evaluation of the shielding effectiveness of a structure against charged particles requires that one determine the energy and angular distribution of said charged particles inside the structure assuming an energy and angular distribution outside the structure. Protons and heavier charged particles with an energy of approximately one billion electron volts or less traverse matter in essentially straight lines and lose energy in a generally continuous fashion through ionization of the material comprising the structure. On the basis of prior theoretical and experimental studies one can determine the final energy (E) of a proton which had an initial energy $E_0$, and then penetrated a given thickness of a given material. Such an evaluation is performed with the aid of energy loss curves (such as are presented in FIG. 1). In this curve the "stopping power" defined as the loss of energy per gram of material traversed is plotted against the energy of the proton for various materials. Alternatively one can plot the energy loss per $10^{24}$ electrons (as is done in FIG. 2). Such a plot reduces the spread in energy loss as a function of the shield material.

For any given proton with initial energy $E_0$ incident on the structure in a given direction one can determine its contribution to the energy and angular distribution inside the structure by assuming that it continues its flight along the original direction and loses an amount of energy determined by the amount and nature of the material or the number of electrons it traverses. Thus the important problem in evaluating the effectiveness of the structure is the determination of the amount of material (or electrons) along each path that a charged particle can take to reach a point interior to the structure.

If the structure in question is of simple shape and homogeneous it is relatively straightforward to determine the amount of material (or electrons) along the various paths by analytic techniques. However, many structures are extremely complex and heterogeneous and such a determination is not feasible by analytic techniques. Such is the case in a space vehicle where a substantial portion of the vehicle is composed of complex electronic, mechanical and electrical equipment. For the preliminary design and evaluation, the equipment generally is assumed to distribute uniformly within the vehicle in a manner representing a homogeneous structure. This assumption greatly simplifies the method for evaluating the shielding effectiveness of the space vehicle. Recognizing that neither the equipment nor its distribution was in fact homogeneous, a safety factor must be used to compensate the increased radiation transmission through low density area. It is apparent that such a method lacks the precision that is required in building a space vehicle in which unnecessary weight increment is a detrimental factor to the total space system.

We have found that the determination of the number of electrons along any path traversing the structure can best be accomplished by utilizing a simple gamma transmission measurement technique. This technique is based on the fact that when a gamma photon passes through matter three important interactions occur which are; photo-electric absorption, Compton scattering and pair production. For elements with proton numbers less than 50 and for gamma radiation in the 1–3 mev. range the Compton scattering process predominates over the other two interactions. For example, the cross section for the Compton scattering process with gammas from $Co^{60}$ (1.17 and 1.33 mev.) represents more than 94% of the total cross section. In a Compton scattering process the photon scatters off one of the atomic electrons changing its direction and loses an amount of energy which is related to the deflection angle by the Klein-Nishina relationship. In this process the electrons act as though they were unbound and the cross section per atom is equal to the cross section per electron times the number of electrons per atom. The attenuation of a gamma ray beam is therefore a measure of the areal electron density of the attenuating medium. If $I_0$ photons per unit area are incident on a thickness $t$ of a material, than the number $I$ of those photons which penetrate that thickness without having had a Compton scattering is given by $$I = I_0 \exp = \int_0^t N_e \mu_e dt$$

where $N_e$ is the number of electrons per unit volume of the material and $\mu_e$ is the Compton cross section per electron. Since $\mu_e$ is independent of the material it can be removed from the integral which is then reduced to the number of electrons per unit area normal to the path. Thus a transmission measurement in which one measures the number of transmitted photons that have not suffered Compton scattering determines the areal electron density from the relationship $$\int_0^t N_e dl = \frac{1}{\mu_e} \cdot \ln \frac{I_o}{I}$$

Since Compton scattering changes the direction of motion and reduces the energy of photons, the unscattered portion of the transmitted beam can be determined either by collimation or by energy discrimination, or by the combination of those techniques.

The equipment used to determine the integral areal electron density can be a simple gamma probe consisting of only a gamma ray source, a gamma ray detector and a positioning device for accurately positioning the sample being measured between the source and the detector. The gamma source can be any radio-isotope that emits gamma rays. We find that $Co^{60}$ or $Cs^{137}$ which are available commercially in large quantity and at a relatively low price are well suited for this purpose. Other radioisotopes such as $Sb^{124}$, $Cs^{134}$, $Se^{75}$, $Sr^{90}$ (BS-Bremsstrahlung), $Ba^{133}$, and $Tm^{170}$ which are gamma emitters can also be used. The gamma detectors can be a NaI crystal connected to a scintillation spectrometer.

To provide measurements necessary to determine the integral areal electron density a beam of gamma rays is first directed to the detector without a sample interposed therebetween to obtain the original intensity of the source $I_o$, after which the sample being measured is placed between the source and the detectors to allow the beam of gammas to penetrate through the sample. Among the attenuated gammas only the gammas that are substantially unscattered are detected which provides the attenuated and unscattered gamma intensity I. Having then found $I_o$ and $I$, the areal electron density can be determined using the mathematical relationship $1/\mu_e \cdot \ln I_o/I =$ the integral areal electron density at that point.

For a heterogeneous structure a number of such gamma transmission measurements must be made to provide an areal electron density distribution of the structure. This electron density distribution establishes the base for measuring its total shielding effectiveness. If the shield effectiveness is desired only at certain specified positions or regions inside the structure then the integral areal electron density need only be measured for those paths through the structure which intersect the specified positions or regions. To illustrate how the method of this invention can be utilized, a particular example is described below with reference to FIGURES 3 and 4. The sample being measured is a compact transistorized receiver which resembles an actual equipment in a manned space capsule. This equipment generally serves the dual purpose of a receiver and as a part of the total shield for the occupants of the capsule against radiation. The receiver measures 5.87 cm. by 8.57 cm. and weighs 153.8 gms. and has an average areal density of 3.05 g./cm.$^2$.

Figure 3:
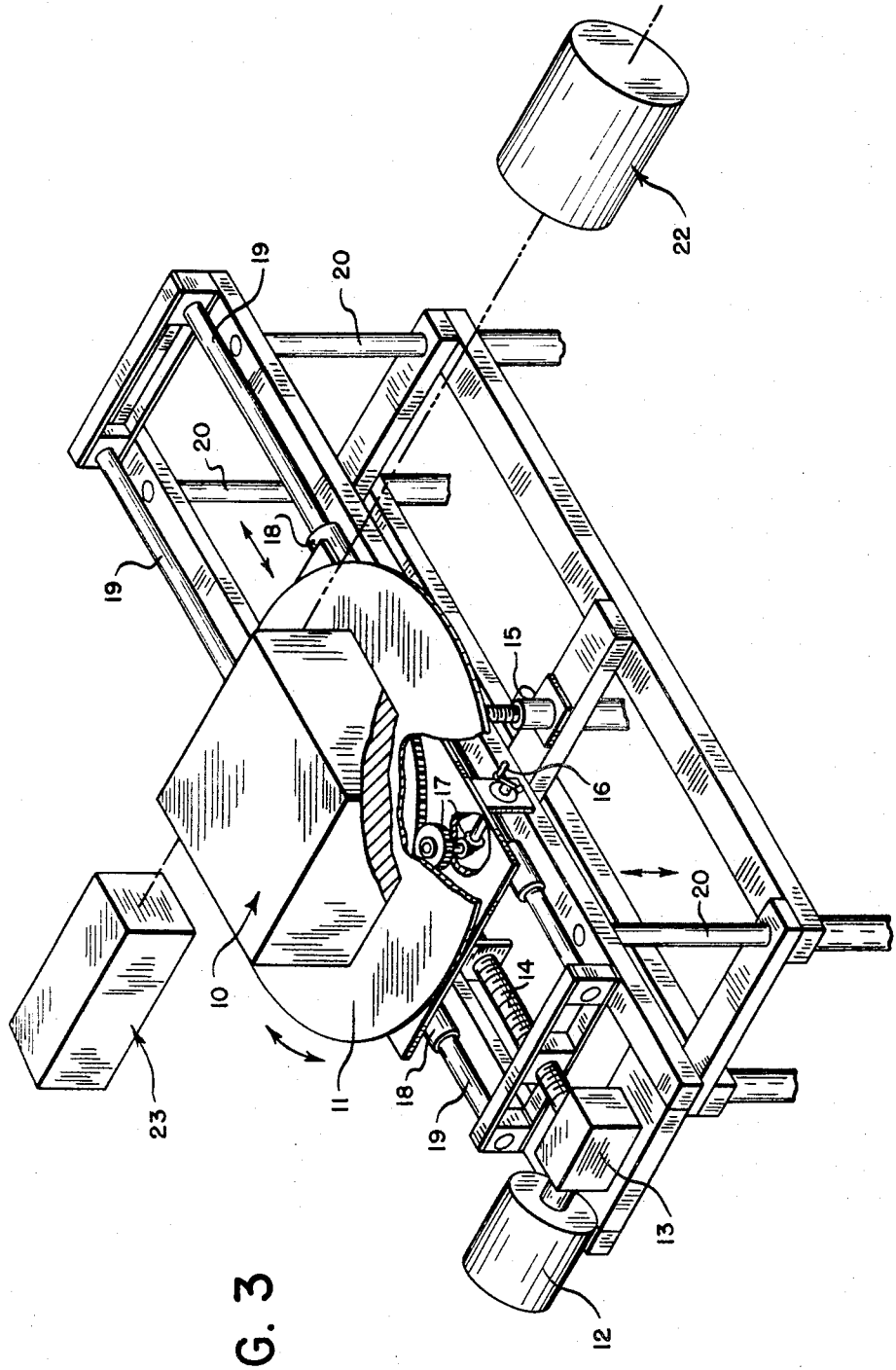
FIGURE 3 is an isometric view of an automatic sample positioning table with a gamma probe.
Figure 4:
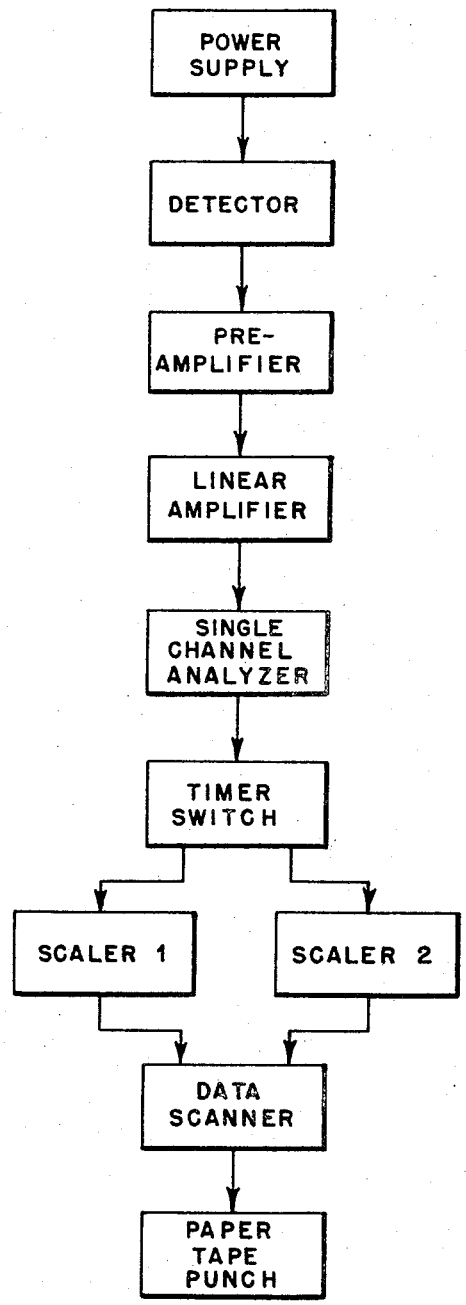
FIGURE 4 is a schematic drawing showing the instrument control of the gamma probe.

The receiver 10 is placed on the circular table top 11 of the automatic positioning table shown in FIGURE 3 for gamma transmission measurement. This circular table 11 can be moved horizontally by motor 12 which is connected to a reduction gear 13. The reduction gear in turn drives a horizontal traverse lead screw 14 to provide a linear horizontal movement with the linear bearings 18 travelling on the guide rods 19. Similarly the vertical movement of this table is provided by a similar motor (not shown) that drives a vertical traverse jack screw 15 to move vertically and is guided by guide rods 20. The circular table can also provide a rotating movement manually using handles 16 which are connected to gearings 17 that provides the rotating movements. The gamma probes consist of a gamma source 22 and a detector 23 which are positioned on the opposite sides of the receiver 10.

A 100 mc. $Co^{60}$ radioisotope is used to provide the gamma radiation which is directed to receiver 10. The beam of radiation is collimated to an area about ½ inch square and each area is examined for 30 seconds. The automatic positioning table provides the linear horizontal and vertical movement so additional positions of this receiver can be examined. The transmited gamma radiation is detected by a NaI crystal detector 23 which is connected to a power supply. (See FIGURE 4). After the pulses pass through the preamplifier and linear amplifier, the signal is fed to the pulse high analyser. Only the pulse falling into the two main peaks of the Co spectrum (1.17 and 1.33 mev.) are counted. A timer switch is provided in the control circuit which allows the examination of each location for 30 seconds. The switch automatically switches the signal to a different scaler when a new location is being examined. This allows the first scaler to read out its total count to the data scanner and the data is permanently recorded by a paper tape punch. The resultant tape is then used in a computer to determine the total effective shield thickness of the receiver. Two or more scalers can be used to alternatively receive the counts from new locations. Typical results for 12 different positions of the sample are given in Table I.

TABLE 1.—ELECTRON DENSITY DETERMINATION IN TRANSISTOR RECEIVER

| Location | Counts | $I_o/I$ | $\ln I_o/I$ | Areal Electronic Density ($10^{23}$ electrons/cm.$^2$)* |
|---|---|---|---|---|
| 0 ($I_o$) | 176,900 | 1 | 0 | 0 |
| 1 | 144,700 | 1.22 | 0.196 | 10.7 |
| 2 | 140,200 | 1.262 | 0.231 | 12.4 |
| 3 | 123,300 | 1.435 | 0.360 | 19.4 |
| 4 | 163,800 | 1.079 | 0.076 | 4.1 |
| 5 | 159,200 | 1.111 | 0.104 | 5.6 |
| 6 | 154,000 | 1.1149 | 0.108 | 5.8 |
| 7 | 159,700 | 1.106 | 0.101 | 5.4 |
| 8 | 164,035 | 1.072 | 0.070 | 3.8 |
| 9 | 137,119 | 1.285 | 0.25 | 13.4 |
| 10 | 155,762 | 1.13 | 0.122 | 6.6 |
| 11 | 150,159 | 1.17 | 0.157 | 8.5 |
| 12 | 153,217 | 1.15 | 0.1395 | 7.5 |

*Electronic density is calculated using $\mu_s = 0.186 \times 10^{-24}$ cm.$^2$/electron.

Table I shows electron distributions of this receiver which serves as the bases to calculate the total shield effectiveness for radiation incident normal to the shield. As a check on the validity of the data, the average areal electronic density from the 12 determination is $8.6 \times 10^{23}$ electron/cm.$^2$, which considering the small samples, is in reasonable agreement with the expected value of $9.2 \times 10^{23}$ electron/cm.$^2$. The latter figure is calculated based on the assumption that the ratio of protons and mass number is ½.

For studying large numbers of individual items of equipment or very complicated structures, it is possible that the data collection and reduction be automated. For determination of the shielding effectiveness of a space capsule automatic equipments and computers can be directly connected to the gamma probes to provide an immediate and detailed knowledge of the shielding structure. Thus improvement of the design of the capsule can be made and elimination of the unnecessary weight increments is accomplished.

By using a simple gamma transmission measurement we are thus able to evaluate the shielding effectiveness of a heterogeneous structure simple and effectively which heretofore required costly machinery or time-consuming computations.

We claim:

1. A method for measuring the shield effectiveness of a heterogeneous structure for shielding against fundamental charged particles comprising:
    (a) directing a beam of gamma radiation of a predetermined initial intensity to a plurality of locations of said structure;
    (b) detecting separately for each location only the intensity of the attenuated and substantially unscattered gamma radiation passed through said structure;

(c) correlating the initial intensity ($I_0$) to the intensity (I) of the attenuated and substantially unscattered gamma radiation of each location;

(d) determining for each location the integral areal electron density of the path of said beam of gamma radiation in accordance with the mathematical relationship $$\frac{1}{\mu_e} \ln\left(\frac{I_0}{I}\right)$$

wherein $\mu_e$ is the Compton cross section per electron; and (e) relating each integral areal electron density to the location to which the beam of gamma radiation is directed whereby the measurement for the total shield effectiveness of said area against said charged particles are obtained.

2. A method for measuring the shield effectiveness of a heterogeneous structure, such as a space capsule, having a non-uniform mass distribution for shielding against proton radiation which method comprises:

(a) directing to a plurality of locations of said structure a collimated beam of gamma radiation of a predetermined initial intensity from $Co^{60}$ gamma ray emitter which has two full energy peaks in its gamma emission spectrum;

(b) detecting separately for each location only the intensity of the attenuated and substantially unscattered gamma radiation passed through said structure by measuring the attenuated radiation in direct alignment with the collimated beam having full energy peaks substantially corresponding to said emitter energy peaks;

(c) correlating the initial intensity of ($I_0$) to the intensity (I) of the attenuated and substantially unscattered gamma radiation of each location;

(d) determining for each location the integral electron density of the path of said beam of gamma radiation in accordance with the mathematical relationship $$\frac{1}{\mu_e} \ln\left(\frac{I_0}{I}\right)$$

wherein $\mu_e$ is the Compton cross section per electron; and (e) relating each integral electron density to the location to which the beam gamma radiation is directed whereby the measurement for the total shield effectiveness of a heterogeneous structure against said proton is obtained.

References Cited
UNITED STATES PATENTS

| | | | |
|---|---|---|---|
| 2,870,336 | 1/1959 | Fountain et al. | 250—83.3 X |
| 2,885,557 | 5/1959 | Kizaur | 250—83.3 X |
| 2,962,590 | 11/1960 | Scherbatskoy | 250—83.3 |
| 2,978,587 | 4/1961 | Forro | 250—83.3 |
| 3,180,985 | 4/1965 | Leighton | 250—43.5 |

OTHER REFERENCES

Lapp, R. E. and Andrews, H. L., Nuclear Radiation Physics, second edition, QC 721, L 36, 1954 C. 2, pp. 108–123.

RALPH G. NILSON, *Primary Examiner.*

S. ELBAUM, *Assistant Examiner.*